(12) United States Patent
MacNeish et al.

(10) Patent No.: US 10,406,754 B2
(45) Date of Patent: Sep. 10, 2019

(54) APPARATUS, SYSTEM AND METHOD OF MONITORING AN ADDITIVE MANUFACTURING ENVIRONMENT

(71) Applicants: William MacNeish, St. Petersburg, FL (US); Erik Gjovik, St. Petersburg, FL (US)

(72) Inventors: William MacNeish, St. Petersburg, FL (US); Erik Gjovik, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 15/723,891

(22) Filed: Oct. 3, 2017

(65) Prior Publication Data

US 2019/0099953 A1  Apr. 4, 2019

(51) Int. Cl.
| | |
|---|---|
| *B33Y 50/02* | (2015.01) |
| *B29C 64/393* | (2017.01) |
| *G05B 19/4099* | (2006.01) |
| *G06F 3/12* | (2006.01) |
| *B29K 101/12* | (2006.01) |
| *B29C 64/118* | (2017.01) |

(52) U.S. Cl.
CPC ............ *B29C 64/393* (2017.08); *B33Y 50/02* (2014.12); *G05B 19/4099* (2013.01); *B29C 64/118* (2017.08); *B29K 2101/12* (2013.01); *G05B 2219/49007* (2013.01)

(58) Field of Classification Search
CPC ...... G06F 3/1259; G06F 3/121; G06F 3/1234; B41F 33/0036
USPC ......................................................... 700/105
See application file for complete search history.

(56) References Cited

U.S. PATENT DOCUMENTS

2015/0045928 A1*  2/2015  Perez .................... B29C 64/112
                                                                700/110

\* cited by examiner

*Primary Examiner* — Michael J Brown
(74) *Attorney, Agent, or Firm* — Thomas J. McWilliams; Barnes & Thornburg LLP (57) ABSTRACT

Apparatuses, systems and methods provide at least a controller for a print server which executes at least one additive manufacturing print process on an additive manufacturing printer. The disclosed embodiments may include a plurality of sensors capable of monitoring at least one of a build perimeter, a build height, and a build volume for an additive print build resultant from the additive manufacturing print; at least one processor associated with the print server and capable of receiving sensor data regarding the monitoring from the plurality of sensors, and comprising non-transitory computing code for applying to the sensor data a print process plan indicative of the additive print build; a comparator embedded in the non-transitory computing code for assessing a lack of compliance by the additive print build to the print process plan; and at least one modified output of the additive manufacturing print suitable to revise the compliance of the additive print build to the print process plan.

20 Claims, 7 Drawing Sheets

APPARATUS, SYSTEM AND METHOD OF MONITORING AN ADDITIVE MANUFACTURING ENVIRONMENT

BACKGROUND

Field of the Disclosure

The present disclosure relates to additive manufacturing, and, more specifically, to an apparatus, system and method of monitoring an additive manufacturing environment.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head from which the material filament is fed to a heated nozzle, an X-Y planar control form moving the print head in the X-Y plane, and a print platform upon which the base is printed and which moves in the Z-axis as successive layers are printed.

More particularly, the FDM printer nozzle heats the thermoplastic filament received from the print head to a semi-liquid state, and deposits the semi-liquid thermoplastic in variably sized beads/traces along the X-Y planar extrusion path plan provided for the building of each successive layer of the element. The size of the printed bead/trace may be based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a heated thermoplastic is squeezed outwardly from a heating nozzle onto either a print plate/platform or a previous layer of the part being produced. The nozzle is moved about by the robotic X-Y planar adjustment of the print head in accordance with a pre-entered geometry, such as may be entered into a processor to control the robotic movements to form the part desired.

In typical FDM print processes, the printing is "open loop", at least in that feedback is not provided so that printing may be correctively modified when flaws occur, or so that printing may be stopped when a fatal flaw occurs. For example, it is typical in known FDM printing that a part may break, at least partially, from the build plate. By way of particular example, in the known art, upon such a fatal print flaw, the printer will generally continue to print until a ball of thermoplastic material is formed about the end of the print nozzle, which ball may encompass the print head and thereby damage or even destroy the printer. Other significant or fatal print flaws may occur in the current art, such as the creation of a "tumbleweed", wherein the print head fails to properly shut off and creates a series of strings that may "flow" about the print build.

Because of the frequency of occurrence of the afore-discussed print flaws, there are typically a great many settings needed to engage in an additive manufacturing print. For example, because bleeding and globbing are frequent, whereby "nipples" or bumps may be undesirably created on a print build, a myriad of settings are generally provided in order to provide for desired printer turn on, turn off, heat levels, and the like. Further, other settings unrelated to the nozzle or print head may be needed, such as a refined temperature control for the build plate so that the build plate temperature does not become excessive and consequently deform the print build.

Therefore, the need exists for an apparatus, system, and method for monitoring at least an FDM additive manufacturing environment.

SUMMARY

The disclosed exemplary apparatuses, systems and methods provide at least a controller for a print server which executes at least one additive manufacturing print process on an additive manufacturing printer. The disclosed embodiments may include a plurality of sensors capable of monitoring at least one of a build perimeter, a build height, and a build volume for an additive print build resultant from the additive manufacturing print; at least one processor associated with the print server and capable of receiving sensor data regarding the monitoring from the plurality of sensors, and comprising non-transitory computing code for applying to the sensor data a print process plan indicative of the additive print build; a comparator embedded in the non-transitory computing code for assessing a lack of compliance by the additive print build to the print process plan; and at least one modified output of the additive manufacturing print suitable to revise the compliance of the additive print build to the print process plan.

Thus, the disclosed embodiments provide an apparatus, system, and method for monitoring at least an FDM additive manufacturing environment.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

In order to address the print flaws discussed above without the need for a large number of selectable print settings, the embodiments provide at least print build volume monitoring using a variety of sensors. For example, sensors in the embodiments may include optical sensors, camera based sensors, time of flight sensors, perimeter sensors, and the like. One or more of the foregoing sensors may monitor aspects of the build volume, such as the total area of the build volume, the perimeter of the build volume, the shape of the build volume, the height of the build volume and/or the layers of the build volume, as well as aspects of the foregoing with respect to discrete portions of a build.

More particularly, cameras, for example, may monitor with particularity one or multiple aspects of a print build volume. Likewise, optical sensors may be aimed across one or more aspects of an outer perimeter of a build. Time of flight sensors may monitor outgoing and reflective light, thereby making distance and size assessments in relation to the build volume. Combinations of multiple ones of the foregoing sensor systems may provide extraordinary levels of build volume monitoring heretofore unknown in the available art. For example, an entire build volume, and all aspects thereof, and all modes thereof, may be monitored using a multimode build volume monitoring system as discussed herein throughout.

While sensors monitor a build, data gained from the feedback from the sensors may enable modification of the build, such as to allow for corrective action by the printer. Such corrective action may include modifying a build plan to account for and correct a minor flaw, or the cessation of a build in the event of that a fatal flaw in the build is detected. As will be understood to the skilled artisan, the use of the sensor data, the feedback assessed thereby and resultant therefrom, and the print action resultant therefrom may be the result of the algorithms applied by a control system connectively associated with the printer and the sensors.

For example, an edge monitor system may be associated with a catastrophic failure algorithm that, in the event of a sensor indication of a breakage of part of the print build as assessed by at least one edge sensor, causes the stoppage of the print system to prevent damage to the printer. Alternatively, an edge monitoring system may assess build quality, such as wherein edge stray is allowed within particular algorithmically-indicated tolerances, and to the extent those tolerances are approached or exceeded, the print plan may be modified to decrease build quantity at particular edge points until an edge correction has occurred such that the build falls within allowable tolerances.

Moreover, even simplistic catastrophic failure build monitoring may be used to assess various more minor print flaws, such as nozzle clogs. This is because even a simplistic monitoring system may allow for an assessment that added material has not been provided where the print plan indicated to the printer that added material should be placed, thus indicating that a clog of a nozzle has likely occurred.

More particularly, algorithms may be provided to compare a build to a print plan, and to assess deltas within and outside tolerances from the print plan. The manner of this monitoring, and the levels of the deltas, may be a function of and indicated by the sensors and algorithms employed, i.e., the combination of sensors and algorithms indicate whether to provide build modification for corrective action, or whether to cease printing in the event of catastrophic failure, upon certain events. By way of non-limiting example, an overall build, a layer-by-layer build height, a build perimeter, or other build aspects maybe algorithmically "pixelized" such that discrete monitoring of minute aspects thereof may be performed by the sensors, and targeted corrective action taken as needed.

Figure 1:
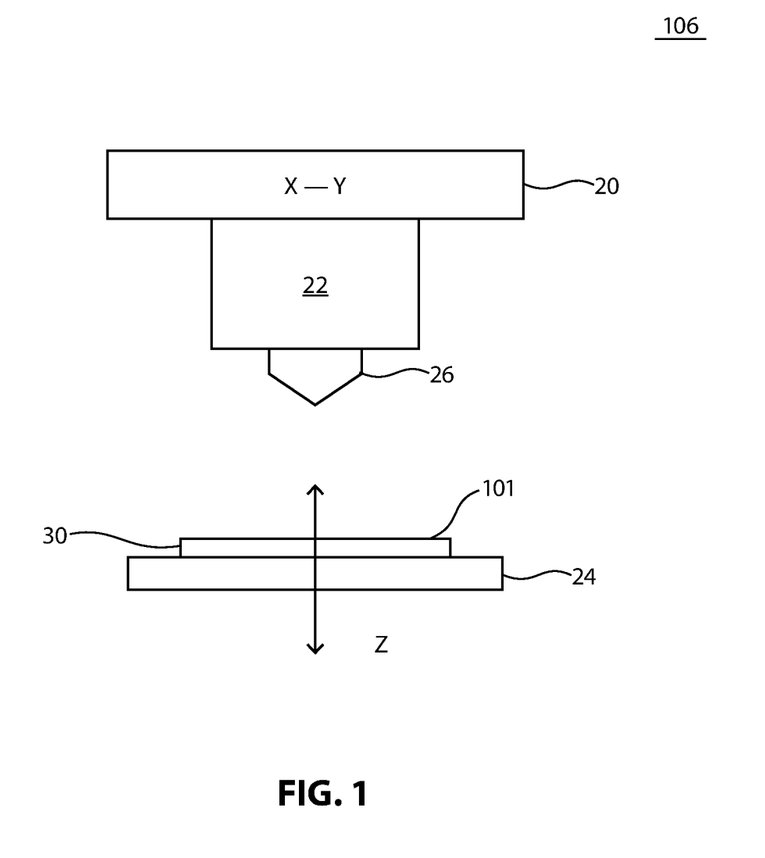
FIG. 1 is an illustration of an additive manufacturing printer.

FIG. 1 is a block diagram illustrating an exemplary FDM printer 106. In the illustration, the FDM printer 106 includes an X-Y axis driver 20 suitable to move the print head 22, and thus the print nozzle 26, in a two dimensional plane, i.e., along the X and Y axes. As is evident from FIG. 1, printing may occur upon the flow of heated print material outwardly from the print nozzle 26 along a Z axis with respect to the X-Y planar movement of the X-Y driver 20 and onto the build plate 24. Thereby, layers of printed material 30 may be provided from the print nozzle 26 along a path dictated by the X-Y driver 20 to form a print build 101.

Figure 2:
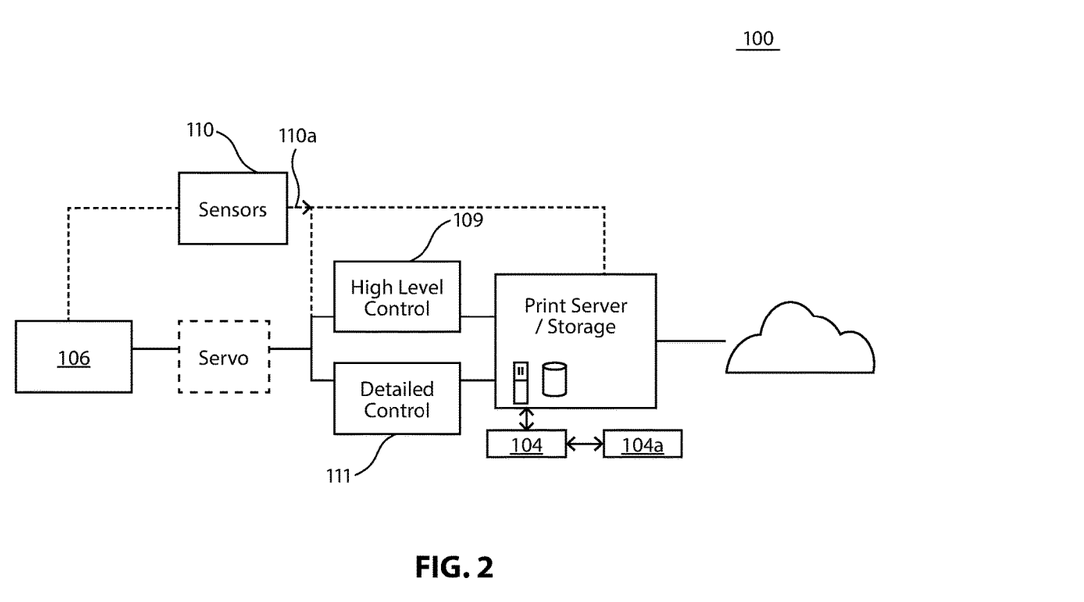
FIG. 2 is an illustration of an exemplary additive manufacturing system.

FIG. 2 illustrates a device and system 100 having high level and refined control over the carrying out of the instructions from a print server 102 to execute an additive manufacturing print process 104 on the FDM printer 106. This high level or refined control is responsive to one or more build volume monitoring algorithms 104a that are part of the additive manufacturing print process 104 and which are integrated with one or more sensors 110 for performing one or more particular types of sensing required by the algorithm 104a.

As such, the high level 109 or refined control 111 receives the "build plan" as part of the additive manufacturing print process 104 from print server 102, and the build plan includes one or more algorithms 104a within additive manufacturing print process 104 that may each include one or more tolerances for one or more aspects of the build plan. The algorithm(s) 104a further may include either or both of modifications to or cessation of additive manufacturing print process 104 upon an assessment by the algorithm 104a of proximity to or exceeding of one or more of the tolerances, based on indications made by sensor(s) 110. The print server 102 may thus be enabled to modify the build plan as executed by FDM printer 106 based on assessments made by algorithm 104a. As such, the additive manufacturing print process 104, print server 102, and sensors 110 form a build volume monitoring system.

More particularly with regard to sensors 110, each sensor 110 generates sensor data 110a that is circulated through the build volume monitoring system, such that the sensor data 110a may be construed by algorithm 104a for application to the additive manufacturing print process 104. Of note, sensors 110 may or may not have any "awareness" of the tolerances being applied by algorithm 104a. Sensors 110 employed may include one or more of: discrete sensors, such as singularly or in an array, wherein the discrete sensors may assess a there/not there condition; single or multiple cameras, which may or may not have specific lighting associated therewith; time of flight imagers; thermal imagers; or parallel or combination implementations of two or more of the foregoing methods, by way of non-limiting example. Various sensor technologies may additionally include transmissive and/or reflective sensing, such as space mapping sensing, such as may use pixels generated by VIS-CMOS.

Once the build volume monitoring system construes the data 110a from sensors 110, the data 110a is compared to the tolerances of additive manufacturing print process 104 by algorithm(s) 104a. So long as tolerances are maintained, the build volume monitoring system may make no modifications to the additive manufacturing print process 104. However, if the print build indicated by data 110a has strayed from process plan 104 such that tolerances are approached or exceeded, refined control as indicated by algorithm 104a may modify the print plan 104 and send to printer 106 in order to modify the build to re-achieve tolerances. Yet further, if the feedback from algorithm 104a indicates that the build plan is grossly out of tolerance, high level control may pause printing to allow for manual corrective action, or may otherwise stop the FDM printer 106 to prevent damage.

Accordingly, the controls and level of detail in tolerances provided in the embodiments may be, at least in part, dependent upon the sensors 110 used by the build volume monitoring system. For example, cameras may be employed, such as in conjunction with lighting sources, to provide sensor monitoring. More specifically, arrayed and/or stereoscopic cameras may be used, such as with structured lighting, such as dark/light stripe lighting, to make build volume assessments. Further, time of flight sensors may be placed in a corner of the build area, such as to allow for the time of flight sensors to watch the part grow while monitoring performance of the print head and print nozzle 26. Thereby, to the extent the arrayed and/or stereoscopic cameras, or the time of flight sensor, or other sensor, assesses stringing, nipples, globs, misshapes, or catastrophic failure, the build volume monitoring system may provide feedback to the FDM printer 106 to perform a requisite function to engage in a build modification, pause, or stoppage.

It will be appreciated, in light of the discussion herein, that certain types of sensors 110 may have the performance thereof significantly enhanced through multiplicative use of the same or different types of sensors 110. For example, time of flight sensing may be significantly improved by averaging data over a very significant number of sensor frames. Moreover and by way of non-limiting example, multiple time of flight imagers, such as each having its own illumination; or multiple time of flight imagers with a single illuminator; or a single time of flight imager with multiple illuminators; or a single camera having a single light source; or a camera array having a single light source; or a single camera having multiple light sources; or a camera array having multiple light sources, may all provide significantly enhanced data sets that allow for operation with either or both of high level (pause/stop) and refined (adjust/modify) control as discussed throughout.

Figure 3:
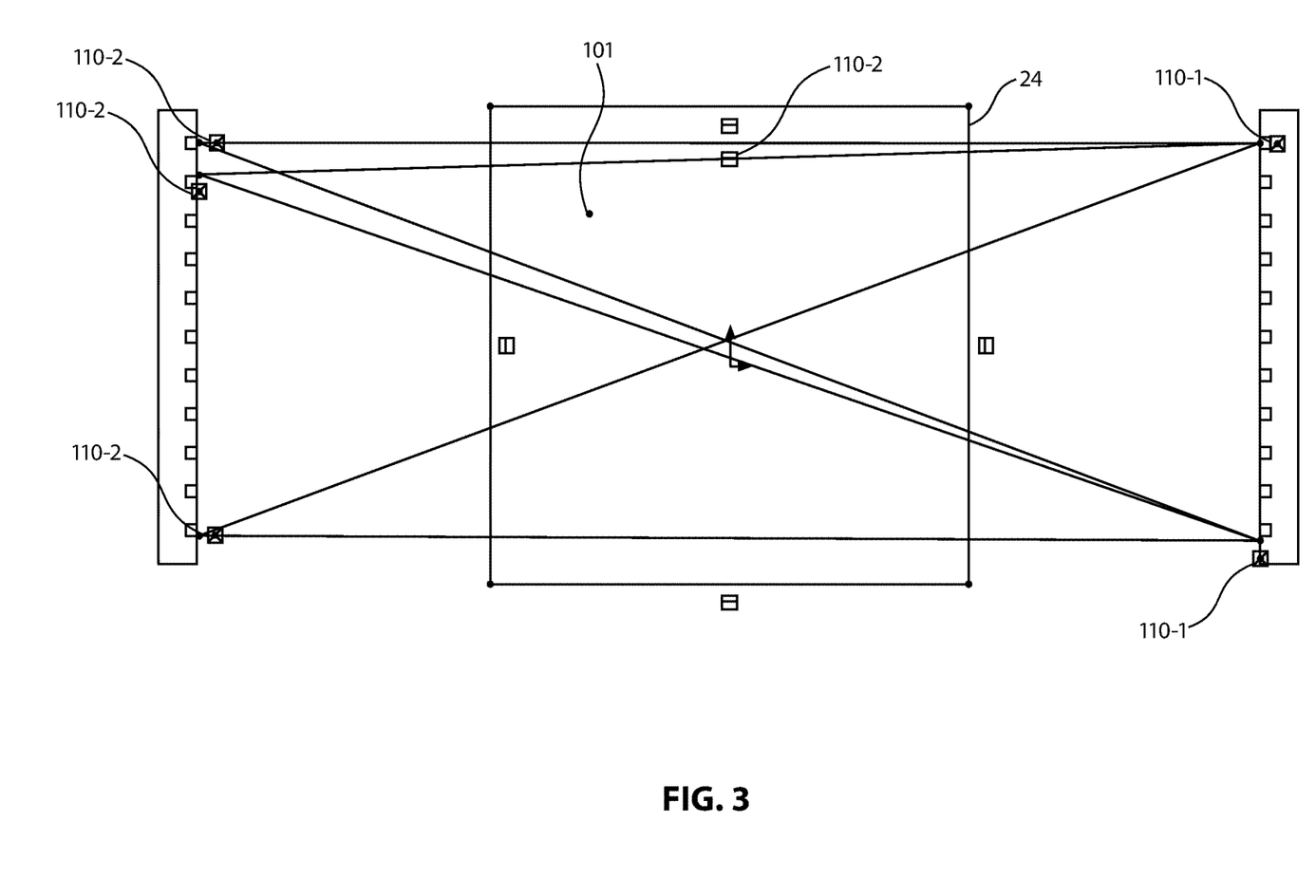
FIG. 3 illustrates an exemplary multiplexed sensor additive manufacturing system.

Further, enhanced data sets 110a may be obtained with more limited numbers of sensors 110, such as through the use of multiplexing. For example and as shown in FIG. 3, the sensor 100 maybe an emitter 110-1-detector 110-2 sensor pair that may be time multiplexed, wherein the emitter 110-1 transmits at a frequency of 200 kilohertz, 210 kilohertz, or 220 kilohertz, such that each detector 110-2 can determine, based on frequency, from which emitter 110-1 a received emission was sent. Thereby, multiple lines of sight across a build volume maybe provided by each single emitter 110-1. Of course, multiplexing may also aid in enhancement of data sets 110a for other than optical sensor pairs 110-1, 110-2, such as where employed with RGB cameras, such as using spectral variations, such as using spectrally varied emitters and detector pairings, and the like, by way of non-limiting example.

Of note, using sensors 110, two forms of monitoring may occur, namely process monitoring (which may be performed largely at the print head 22 and/or the print nozzle 26), and the build volume monitoring discussed throughout. As used herein, build volume monitoring may be used to assess aspects of the print build 101 itself, such as, by way of non-limiting example: movement or breakage of the part, or other catastrophic failure; the quality of the print build 110, such as the perimeter of the part, the height of the layers of the part, the form or footprint of the part or each layer thereof, including any stringing, bleed, nipples or the like; and likely printer failure, such as nozzle clog, nozzle failure, print head failure, or the like based on the lack of an ongoing build 101.

Figure 4:
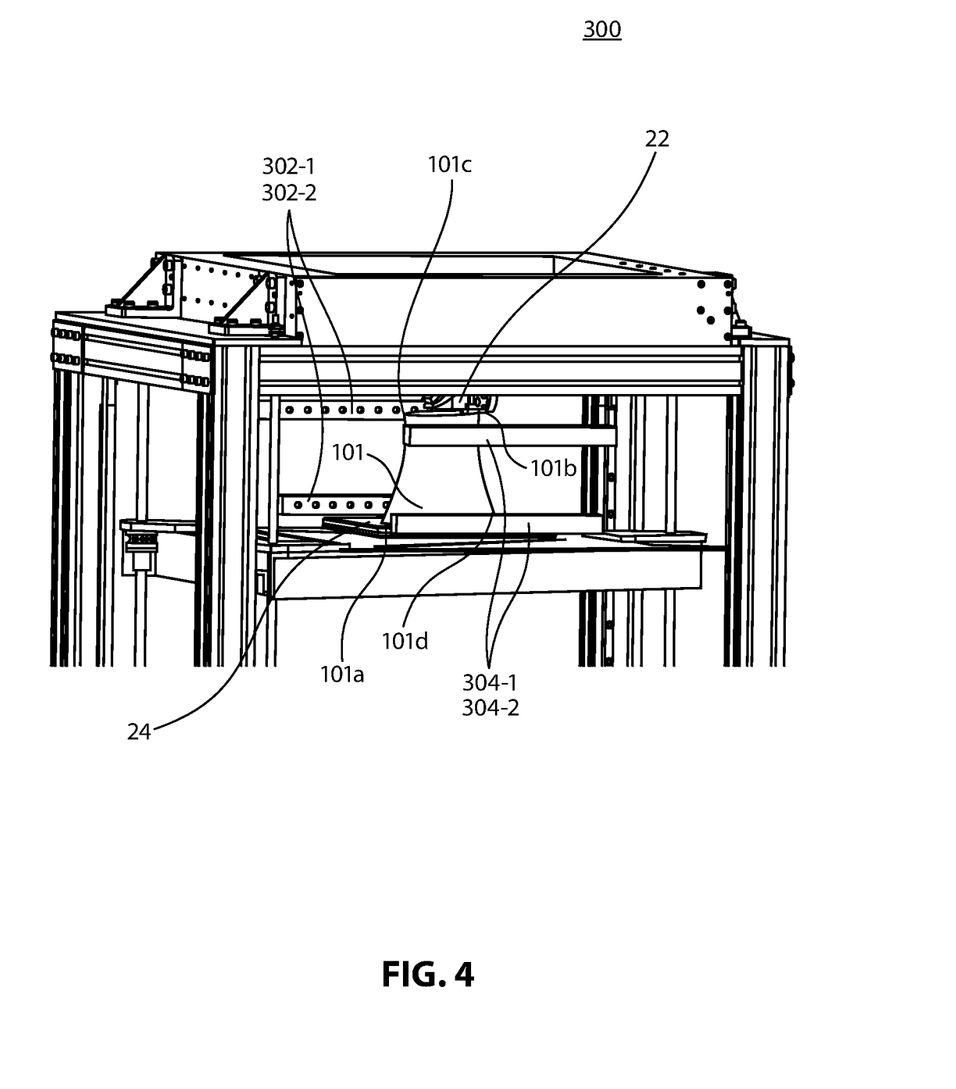
FIG. 4 illustrates an exemplary additive manufacturing system with matched sensor pairs.

FIG. 4 illustrates a particular example of a build volume monitoring system 300. Included in the particular embodiment illustrated by way of example in FIG. 4 are a print head 22, a build plate 24, and two discrete emitter-detector pairs, 302-1/302-2, 304-1/304-2. These emitter/detector pairs 302-1/302-2, 304-1/304-2 may be, by way of non-limiting example, discrete or arrayed reflective and transmissive emitter detector pairs. Further, as discussed herein, these emitter/detector pairs 302-1/302-2, 304-1/304-2 may be multiplexed within single arrays, across paired pathway arrays, and so on. Moreover, multiplexing may include any type of known multiplexing for multi-path detection for a given emitter or emitters, as discussed herein.

In that certain of the embodiments illustratively shown in FIG. 4, the discrete emitter/detector pairs 302-1/302-2, 304-1/304-2 may monitor the build volume 101 on build plate 24 at ones of the edges/out perimeter bounds 101a, b, c, d thereof, such as including the "front" and "back" edges 101a, b, and the "top" and "bottom" edges 101c, d, such as may be taken in relation to the build plate 24. Moreover, this edge monitoring may be performed in relation to the print head 22, such as in order to maintain a relational detection as between the printing by the print head 22 and print nozzle 26 and the build part 101.

Figure 5:
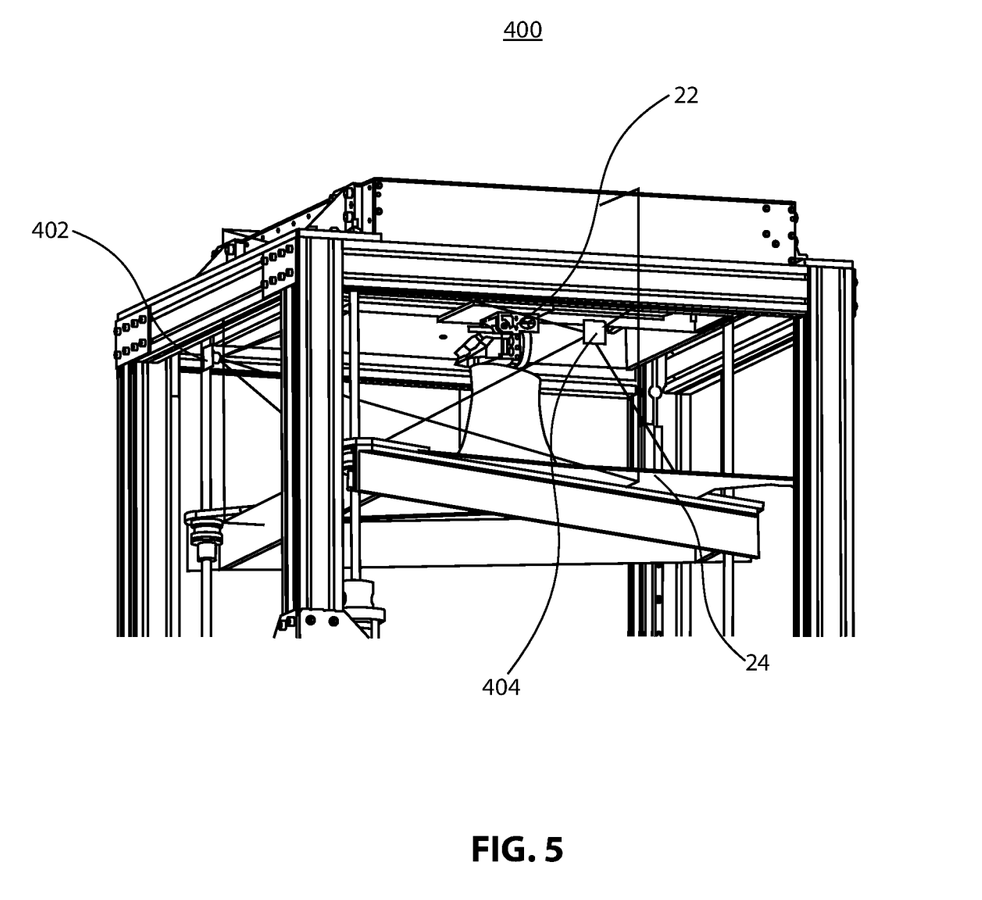
FIG. 5 illustrates an exemplary additive manufacturing system with camera sensors.

FIG. 5 illustrates an embodiment of a build volume monitoring system 400. The illustration of FIG. 5 includes a print head 22, a build plate 24, and 2 "BVM" camera sensors 402, 404. Of note, the BVM camera sensors 402, 404 may be paired with illumination sources (not shown), such as to aid in proper operation of the camera(s). The BVM camera sensors 402, 404 may be discrete or arrayed, and in addition to having discrete and/or structured illumination sources, may be arranged so as to provide an orthogonal interpretation, a stereoscopic interpretation, or the like, by way of non-limiting example.

Figure 6:
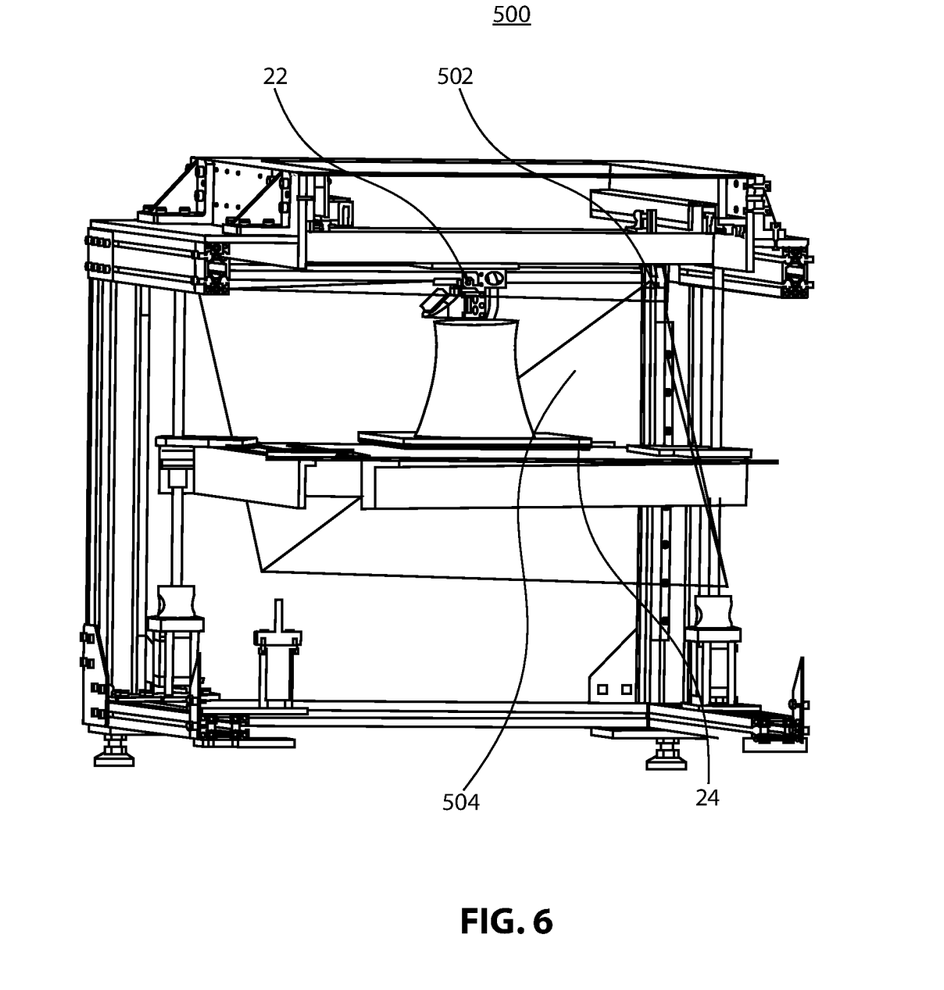
FIG. 6 illustrates an exemplary additive manufacturing system with time of flight sensors.

FIG. 6 illustrates a time of flight build volume monitoring system 500. As illustrated in FIG. 6, an exemplary flight build volume monitoring system 500 may include a print head 22, a build plate 24, and at least one time of flight sensor 502 having a time of flight field of view 504. It will be understood that a single or multiple time of flight imagers 502 may be used, and may be paired with a single or multiple illuminator subsystems (not shown). Further and as will be apparent to the skilled artisan, irrespective of the arrangement of the time of flight sensor or sensors 502, the print build 101 should be maintained within the time of flight field of view 504. Of additional note, the use of a time of flight build volume monitoring system 500 may carry with it a marginal additional cost over and above that of other methods of build volume monitoring discussed throughout.

Those skilled in the art will appreciate, in light of the discussion herein, that sensor embodiments are not limited to those disclosed and discussed above. Further, it will be understood that the implementation of processing and controls, inclusive of build volume monitoring algorithms, as discussed herein may occur using local or remote computer processing. Thereby, the disclosed systems and methods may be provided with network, such as wired or wireless, connectivity, or may not be provided with such connectivity. Moreover, network capability may not only allow for application of algorithms for build volume monitoring from remote computer processors, but may additionally allow for availability of manual process adjustment from remote locations based on data reception at those remote locations.

Figure 7:
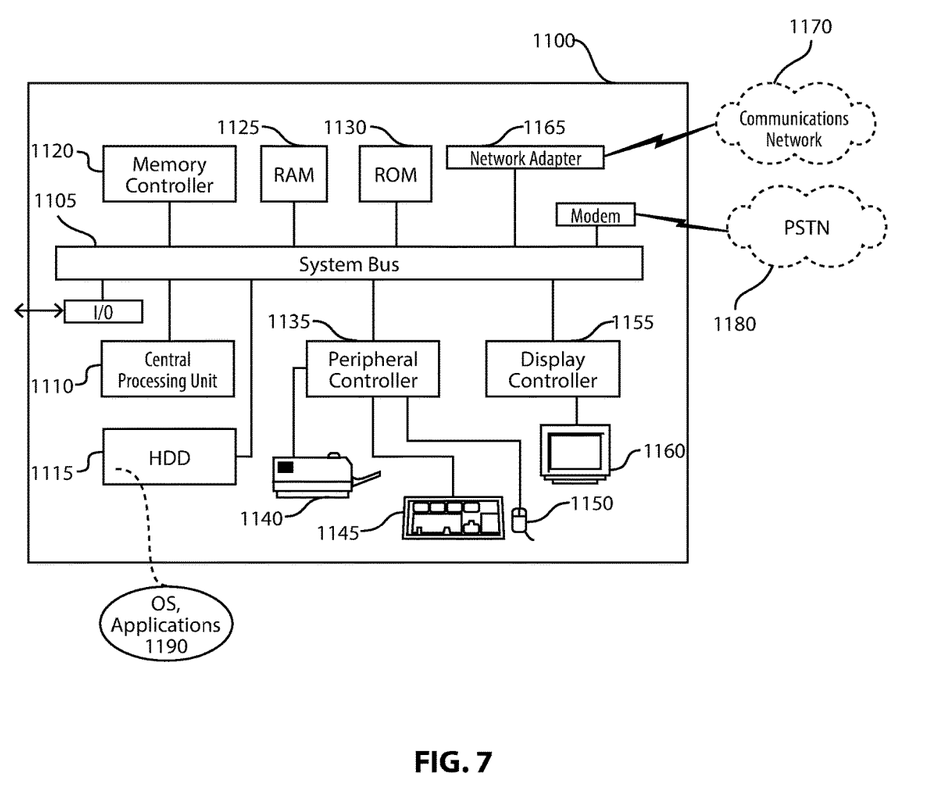
FIG. 7 illustrates an exemplary computing system.

FIG. 7 depicts an exemplary computing system 1100 for use in association with the herein described systems and methods. Computing system 1100 is capable of executing software, such as an operating system (OS) and/or one or more computing applications 1190, such as applications applying the algorithms 104a discussed herein, and may execute such applications using data, such as sensor data, gained via the I/O port.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the computing system's 1100 main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus 1105. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A system capable of controlling at least one additive manufacturing print, comprising:
    a plurality of sensors capable of monitoring at least one of a build perimeter, a build height, and a build volume for an additive print build resultant from the additive manufacturing print;
    a print server comprising at least one processor capable of receiving sensor data regarding the monitoring from the plurality of sensors, and comprising non-transitory computing code for applying to the sensor data a print process plan indicative of the additive print build;
    a comparator embedded in the non-transitory computing code for assessing a lack of compliance by the additive print build to the print process plan; and
    at least one modified output from a revised print process plan that modifies the additive manufacturing print from the print process plan during the additive manufacturing print suitable to revise the compliance of the additive print build to the print process plan.

2. The system of claim 1, wherein the print process plan includes one or more tolerances for the one or more aspects of the additive print build.

3. The system of claim 1, wherein the revision to the compliance comprises one of modifications to the print process plan or cessation of the additive manufacturing print.

4. The system of claim 1, wherein the revision to the compliance a modification to one of the build volume, the build height for a next layer of the additive manufacturing print.

5. The system of claim 1, wherein the plurality of sensors comprises at least one of: discrete sensors, singularly or in an array; or single or multiple cameras; or time of flight imagers; thermal imagers; or parallel or combination implementations thereof.

6. The system of claim 1, wherein the plurality of sensors comprises at least one of: transmissive sensing; or reflective sensing; or space mapping sensing; or pixelized sensing.

7. The system of claim 1, wherein the plurality of sensors comprises at least one camera and at least one correspondent light source.

8. The system of claim 7, wherein the correspondent light source comprises at least a dark-light stripe light source.

9. The system of claim 1, wherein the plurality of sensors comprises at least one time of flight sensor in a print area corner.

10. The system of claim 1, wherein the lack of compliance comprises at least one of stringing, nipples, globs, misshapes, part breakage, part movement or catastrophic failure.

11. The system of claim 1, further comprising multiplexing the plurality of sensors, wherein the multiplexed plurality of sensors comprises at least one unique emitter multiplexed to two or more detector sensors.

12. The system of claim 11, wherein the multiplexing the at least one unique emitter to two or more detector sensors comprises a time variation between each of the at least one unique emitters.

13. The system of claim 12, wherein the time variation comprises variations between 200 kilohertz, 210 kilohertz, and 220 kilohertz.

14. The system of claim 11, wherein the multiplexing comprises single emitter multi-sight lines.

15. The system of claim 1, wherein the monitoring comprises edge detection, and wherein the modified output comprises a decreased volume in a subsequent layer.

16. A method of controlling a print server executing at least one additive manufacturing print process on an additive manufacturing printer, comprising:
   monitoring at least one of a build perimeter, a build height, and a build volume for an additive print build resultant from the additive manufacturing print;
   receiving the monitoring as sensor data from a plurality of sensors;
   applying to the sensor data a print process plan indicative of the additive print build;
   comparing the additive print build to the print process plan to assess a lack of compliance; and
   modifying at least one output of the additive manufacturing print to revise the compliance of the additive print build to the print process plan.

17. The method of claim 16, wherein the modifying comprises cessation of the additive manufacturing print.

18. The method of claim 16, wherein the monitoring comprises time of flight monitoring.

19. The method of claim 16, wherein the monitoring comprises providing structured lighting.

20. The method of claim 16, further comprising multiplexing multiple ones of the plurality of sensors.

* * * * *